INVENTORS F. B. CROWSON
G. S. GROTH
BY Kenneth B. Hamlin
ATTORNEY

STEERABLE REGENERATIVE REPEATER CIRCUIT 3,435,142
Patented Mar. 25, 1969

3,435,142

STEERABLE REGENERATIVE REPEATER CIRCUIT

Fred B. Crowson, Brooklyn, and George S. Groth, Bronx, N.Y., assignors to Bell Telephone Laboratories Incorporated, New York, N.Y., a corporation of New York Filed Aug. 16, 1965, Ser. No. 480,017
Int. Cl. H04l 25/20, 25/52, 15/00
U.S. Cl. 178—73 12 Claims

ABSTRACT OF THE DISCLOSURE

A control circuit for a multiple station telegraph network is arranged so that only one remote station at a time transmits a message through a receive hub, a regenerative repeater, and a send hub to receivers of all other stations in the network. The control circuit is further arranged so that while that one station is transmitting, any receiving station can send selected control signals, such as a break signal, by way of a path bypassing the regenerative repeater and going directly to the receiver of the transmitting station. The control signals therefore do not interfere with the message received at any of the other receiving stations.

The invention is a telegraph hub coupling circuit more particularly described as a coupling control circuit for interconnecting a telegraph hub concentration with a unilateral transmission circuit.

In a private line telegraph network it is desirable to arrange the network in a manner that enables one of a plurality of subscriber stations to transmit signals simultaneously to all other subscriber stations in the network. This is accomplished by utilizing a hub concentration wherein each subscriber station is extended for transmitting by means of an individual receive leg to a common receiving terminal, hereinafter referred to as a receive hub, and extended for receiving by means of an individual send leg to a common sending terminal, hereinafter referred to as a send hub. These legs and hubs are identified by their function relative to a unilateral regenerative repeater which is positioned centrally in the network like the hub of a wheel. The receive hub receives message signals from one of the subscriber stations and applies the signals to an input terminal of the regenerative repeater which has an output terminal for applying regenerated signals to the send hub for transmittal to the other stations.

While a transmitting station is sending message signals, its own printer types a local copy of the transmitted message from a series of local undelayed signals. The prior art coupling circuits provide a means to block the time delayed message signals that are retransmitted by the regenerative repeater from being transmitted back to the receiver and printer of the transmitting subscriber station. The signals are blocked so that they do not interfere with the local undelayed signals and thereby garble the transmitting station's local copy of the message. With the prior are arrangement it is possible for two network stations to simultaneously transmit different messages, which interfere with each other within the regenerative repeater, and cause a garbled message to be retransmitted to all stations in the network.

It is an object of this invention to reduce message errors inherent to the operation of a hub coupling arrangement of a multiple station telegraph network.

It is another object of this invention to implement control of a multistation telegraph network within the associated facilities of a transmitting station when that station is the first station to transmit a message subsequent to a period during which all stations were idle.

These and other objects of this invention are realized in an illustrative embodiment thereof which is a telegraph network coupling control circuit for a multiple station telegraph network. A coupling control circuit for each station is arranged at a centrally located site with interlocking controls so that a station which first transmits a message takes over control of the coupling of all network stations to a regenerative repeater. While one station transmits, the coupling control circuits disable the coupling of receiving stations to the regenerative repeater input and disable the coupling of the transmitting station to the regenerative repeater output. Both a control signal sent from another station to the transmitting station and a channel interference signal applied to a facility of a receiving station and having the appearance of a control signal bypass the regenerative repeater and are coupled to the transmitting station without coupling to any other stations. A timing circuit is incorporated in the station equipment of each station to disable its transmitter whenever that station is transmitting and a control signal of predetermined duration is received at that station. A second station can take over control of the network by first sending the control signal of predetermined duration and then sending standard message signals.

A feature of the invention is a hub coupling control circuit incorporating coincidence circuitry to disable coupling of receiving stations to a regenerative repeater input and thereby implement control of network coupling by a sending station during an interval in which that station is transmitting.

Another feature of the invention is a hub coupling control circuit incorporating coincidence circuitry and an overriding control which bypass a regenerative repeater to couple a receiving station to the transmitting station for sending control signals from the receiving station to the transmitting station without sending those control signals to the other receiving stations.

A further feature is that a first station of a multiple station telegraph network takes over control of the coupling of all station associated equipment to the common network equipment while the station is transmitting and that the first station relinquishes to a second station the control of the coupling of all station associated equipment to common network equipment after the second station transmits an overriding control signal of predetermined duration.

A better understanding of the invention may be derived from the detailed description following if that description is considered with respect to the attached drawings in which.

Figure 1:
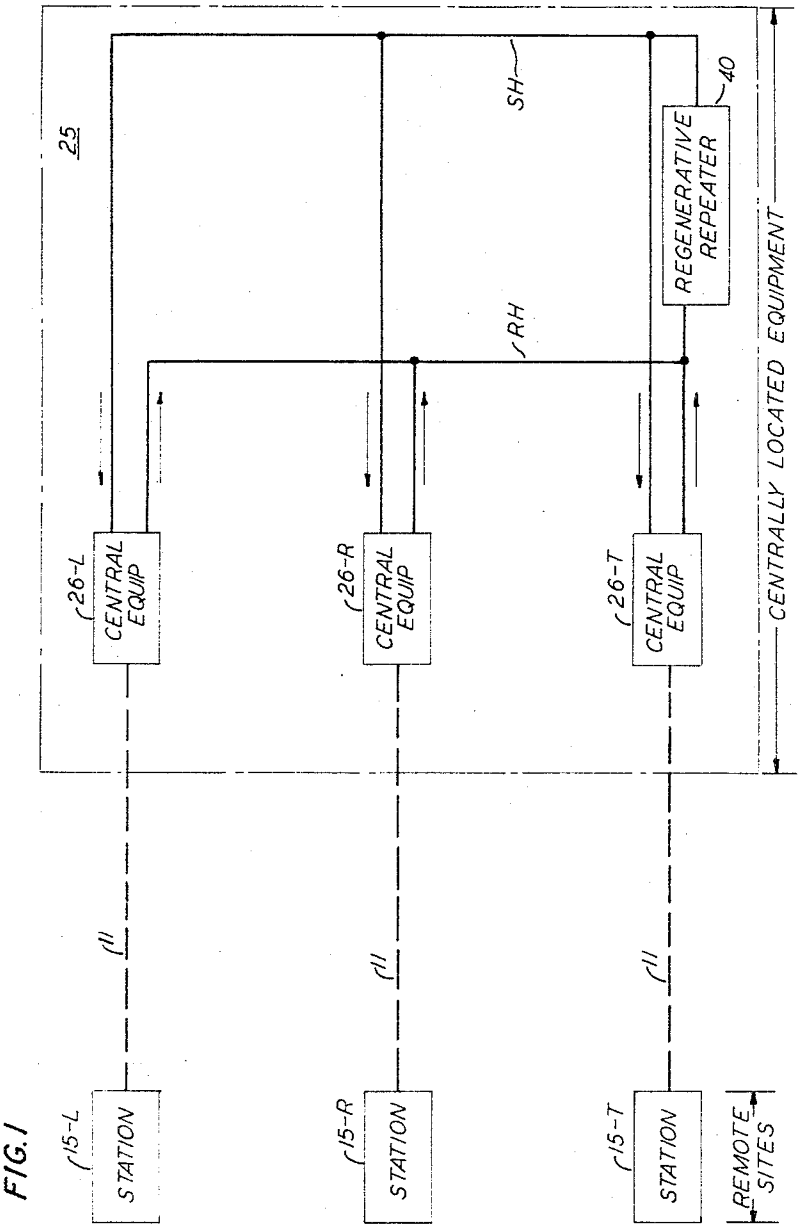
FIG. 1 is a block diagram of a multiple station telegraph network.

Referring now to FIG. 1, there is shown a multiple station telegraph network including centrally located equipment 25 and a plurality of telephone channels 11 which couple the centrally located equipment 25 to a plurality of network stations 15–L, 15–R and 15–T located at diverse remote sites. Subsequently, in the discussion of FIGS. 3, 4, 5 and 6, station 15–L represents a station on the left of the diagram and station 15–R represents a station on the right of the diagram. Thereafter, in the discussion of FIGS. 7, 8 and 9, a third station 15–T is added to the network. Each station is equipped to transmit signals over its associated channel 11 to associated central equipments 26–L, 26–R and 26–T. The associated central equipments 26–L, 26–R and 26–T are arranged to receive signals from their respectively associated stations and to forward those received signals through a multiple arrangement to a common terminal called a receive hub RH on the input side of a regenerative repeater 40. The regenerative repeater 40 sends regenerated signals through a common terminal called a send hub SH to the central equipments 26–L, 26–R and 26–T. These regenerated signals from the regenerative repeater pass by way of the central equipments and the channels 11 to the remote stations. The stations 15–L, 15–R and 15–T are arranged to receive the signals transmitted from their associated central equipments.

In the course of operation of this network only one station normally transmits a message at a time in a manner similar to half duplex operation. While the one station is transmitting a message, it takes over control of the network and blocks all other stations from transmitting messages o the regenerative repeater. The transmitting station does not receive its own message signals regenerated by the regenerative repeater. However, each of the other stations does receive the message signals regenerated by the regenerative repeater. While one station is transmitting a message, a receiving station can send selected control signals directly to the transmitting station without interfering with the original message transmission to all other receiving stations. These control signals are used by the receiving station to inform the transmitting station of some trouble condition in the network, and to take over control of the network from the original transmitting station. Additionally, a channel interference signal applied to the transmitting facilities of a receiving station is sent directly to the transmitting station without interfering with the original message transmission to all other receiving stations.

Figure 2:
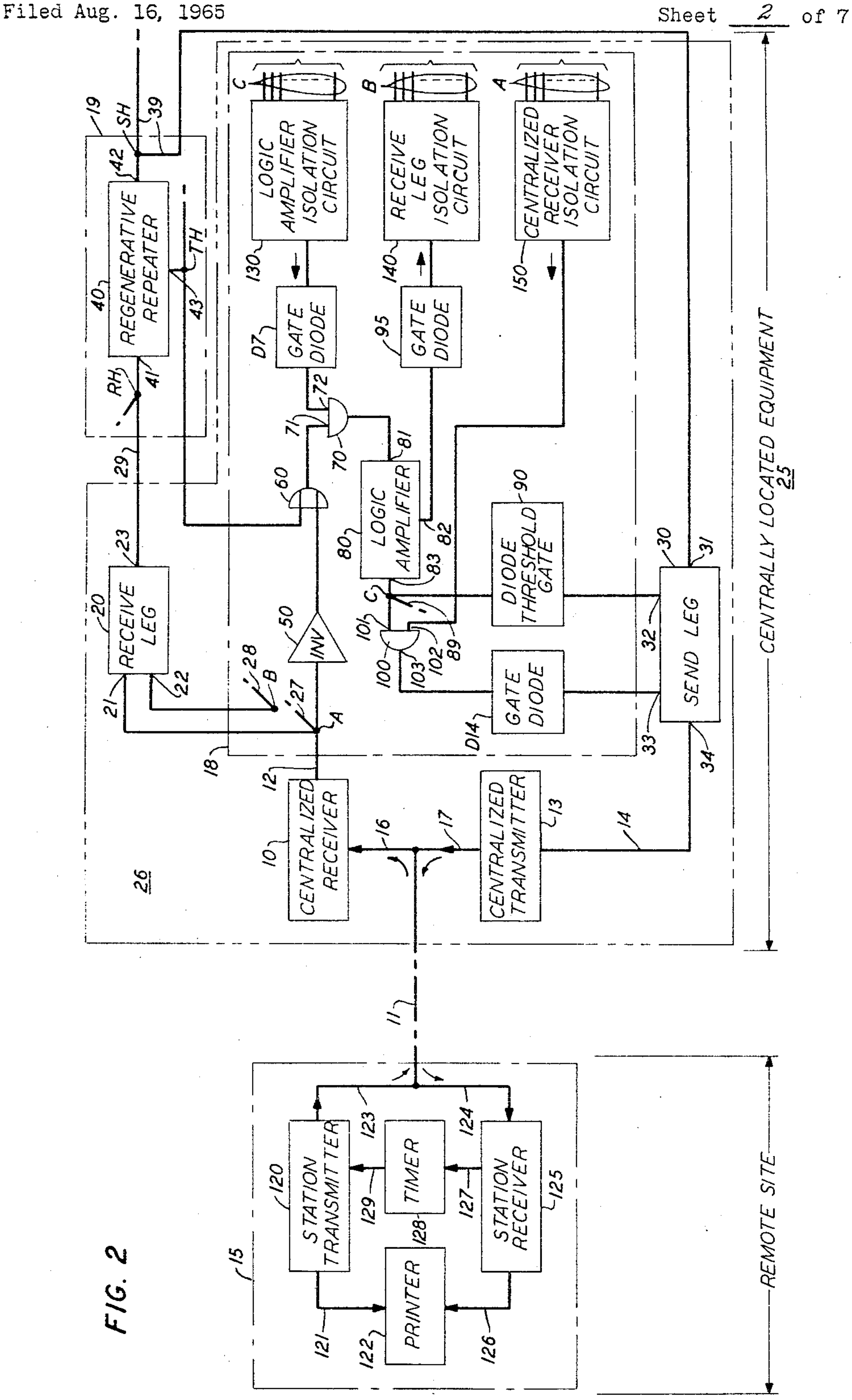
FIG. 2 is a block diagram of a telegraph station and associated centralized equipment, which interconnects with a multiple station telegraph network.

Referring now to FIG. 2, there is shown a block diagram of a telegraph station 15 including a station transmitter 120 which is coupled through a lead 121 to a printer 122 for printing a local copy of a transmitted message concurrently with a transmssion of that message to other stations within the network. There are other stations within the network, but not shown, having equipment similar to the station 15 and being arranged to normally receive and print messages when the station 15 transmits a message. A message is a group of words made up of characters from a code comprising mark signals, space signals, start spaces, and stop pulses. Messages, transmitted from the station 15 by the station transmitter 120, are coupled through a lead 123, a two-way telephone channel 11, and the centrally located equipment 25 to the other stations within the network. Messages, transmitted from a station other than station 15, are coupled through the centrally located equipment 25, the channel 11, and a lead 124 to a station receiver 125 where they are received by the station 15. A received message passes through the station receiver 125 and a lead 126 to the printer 122 where the message is printed. The received message is also directed from the station receiver 125 through a lead 127 to a timer 128, which is coupled to the station transmitter 120 by a lead 129.

The timer 128 serves a new and useful purpose in a situation in which the station 15 is transmitting a message and a receiving station transmits a break signal. A break signal is a control signal of predetermined duration, usually two character lengths in duration. A character length is a time duration including time for a start space, a standard number of code elements, and a stop pulse. The break signal is transmitted by the receiving station to inform the transmitting station that a message error has been received at the receiving station and that a retransmission of the message is necessary. The timer 128 is of a well-known type that normally does not produce an output signal but does produce an output signal when a space signal applied to its input persists longer than a selected duration. The output signal is used to disable the transmitter in any one of several known methods. For example, the output signal from the timer is used to pulse a release winding of a relay, not shown, which is normally operated during an interval of transmission by the station 15 and which has normally closed contacts completing a closed path in an on-off circuit of the station transmitter 120. When a pulse of less duration than one and one-half character times is applied to the input of the timer 128, no output signal results. However, when a signal, such as a break signal, of greater duration than approximately one and one-half character times, is applied to the input of the timer 128, an output signal is produced. This output signal releases the relay which disables the station transmitter 120. After having sent a break signal, the receiving station becomes a transmitting station by sending its own message to the station 15 and to the other stations and thereby provides information concerning the nature of the error received.

FIG. 2 additionally shows the central equipment 26 associated with the station 15. This central equipment 26 of the station 15 includes a centralized receiver 10 and a receive leg 20 which are associated with the station transmitter 120, a send leg 30, and a centralized transmitter 13 which are associated with the station receiver 125, and a coupling control circuit 18 which controls the coupling of the station transmitter 120 and the station receiver 125 of the station 15 to other network stations.

In FIG. 2, the station transmitter 120 modulates direct current potential marking and spacing signals into frequency modulated signals which are sent through the two-way telephone channel 11 and a lead 16 to the centralized receiver 10. The centralized receiver demodulates and forwards those signals through a lead 12 to a junction A as direct current potentials. The junction A is a common terminal for the centralized receiver output signals which are characterized as ground potential for a marking signal and as a negative twenty volt potential for a spacing signal. In the embodiment of FIG. 2, specific voltages are advantageously employed to facilitate the description, but the invention is not considered to be limited thereto. The junction A is connected to a first input terminal 21 of the receive leg 20 for forwarding marking and spacing signals and for implementing control of the network under direction of the station 15 whenever that station is transmitting. The junction A is additionally connected by a plurality of leads 27 to a centralized receiver isolation circuit 150, to be described, of the coupling control circuit of each station within the network other than station 15. When the station 15 is a receiving station, it can send a break signal and any other spacing signal through the junction A and the centralized receiver isolation circuit of the transmitting station to provide a means of communicating from station 15 directly to the transmitting station. This means of communicating to the transmitting station will not interfere with communication from the transmitting station to any other network station.

When the station 15 is transmitting and has control of the network, the receive leg 20 is a circuit which translates signals that have passed through the centralized receiver 10 into a form which is appropriate for operating a regenerative repeater 40. Additionally, in this invention, the receive leg 20 is used to block message signals sent by the station 15 when another station is transmitting a message and has control of the network The receive leg 20 has a second input terminal 22 which is connected to a junction B. An output terminal 23 is connected to a receive hub RH for forwarding message signals to the regenerative repeater 40.

The junction B is connected by a plurality of leads 28 to a receive leg isolation circuit 140, to be described, of the coupling control circuit of each station within the network other than station 15. The junction B applies a blocking control signal to the receive leg 20 whenever another network station is transmitting and station 15 is receiving so that the station 15 cannot send signals which pass through its receive leg to the receive hub RH where they would interfere with the other station's message.

Included in the central equipment 26 associated with the station receiver 125 is a send leg 30. The send leg 30 is a circuit which normally translates output signals from the regenerative repeater 40 into a form which is appropriate to operate the centralized transmitter 13. The output signals from the send leg 30 are characterized as a negative ten volt potential for a marking condition and as a positive seven volt potential for a spacing condition. In this invention, the send leg 30 is additionally used to block message signals, produced at a send hub SH as a result of a message transmission by the station 15, from being sent to the station 15. The send leg 30 is further used to pass control signals from any other station through to the station receiver 125 while the station 15 is transmitting.

The send leg 30 has a first input terminal 31 which is connected to the send hub SH for receiving message signals from the regenerative repeater 40. The send leg 30 also has a second input terminal 32 and a third input terminal 33 each of which is connected to the coupling control circuit 18 for receiving control signals from the coupling control circuits of all stations in the network. The send leg 30 has an output terminal 34 which is coupled through a lead 14 to the input of the centralized transmitter 13 for applying signals from a station other than station 15 to the input of the centralized transmitter 13. The centralized transmitter 13 modulates marking and spacing signals in the form of direct current potentials into frequency modulated signals which are sent by way of a lead 17 and the telephone channel 11, to the station receiver 125. The receiver demodulates the frequency modulated signals into direct current potentials in preparation for printing.

The coupling control circuit 18, which has several input and output terminal conditions to be described in detail hereinafter, controls the intercoupling of the central equipment 26 to a combination of common network equipment 19 and to the central equipment associated with each of the other subscriber stations in the network. The arrangement of intercoupling of equipment at any time is dependent upon the signaling conditions of each network station.

When all of the stations are in an idle condition and are sending a marking signal each receive leg is disabled so that no signals are applied to the receive hub RH and to the input of the regenerative repeater 40. In this condition all send legs produce a marking signal at their outputs for transmission to their associated stations.

When transmissions begins by one station, such as station 15, that station takes control over the coupling of all network equipment by sending a start space and directs message signals through the receive leg 20 to the input of the regenerative repeater 40 and by way of an inverter 50, a positive-going diode OR gate 60 to a first input 71 of a transistor AND gate 70. A marking condition produced by all other network stations is applied to a second input 72 of the positive-going AND gate 70 by way of a logic amplifier isolation circuit 130 and a gate diode D7. The start space condition transmitted from station 15 concurs with the marking condition at the inputs of the transistor AND gate 70. The positive-going AND gate 70 is normally disabled, but it is enabled by concurrence of these conditions and changes its output signal potential which is applied to the input 81 of a logic amplifier 80. The logic amplifier 80 is a circuit which produces two complementary output signals from separate output terminals 82 and 83. The complementary output signals are interchanged by a change of input signals. A first output signal is directed through a diode gate 95 and a receive leg isolation circuit 140 to the junction B in the coupling control circuits of all other stations in the network. This signal is a blocking control signal which is applied to the receive legs of all other network stations to prevent message signals, transmitted by other stations, from being applied to the input of the regenerative repeater 40 while the station 15 is transmitting. Thus, after the station 15 has taken over coupling control of the network only the station 15 can transmit a message through the regenerative repeater 40 while the other stations are blocked from doing so. A second output signal of the logic amplifier 80 is applied through a junction C and a diode threshold gate 90 to the second input terminal 32 of the send leg 30. This second signal is the blocking control signal which is applied to the send leg 30 to prevent regenerated message signals from being sent to the station 15 while the station is transmitting.

The junction C is connected by a plurality of leads 89 to the logic amplifier isolation circuit 130, to be described, of the coupling control circuit of each station in the network other than station 15. The potential of junction C operates through the logic amplifier isolation circuit 130 to apply a disabling signal to the transistor AND gate 70 of all stations other than station 15 when that station is transmitting.

The second output signal of logic amplifier 80 is additionally applied through junction C to a first input terminal 101 of a negative-going diode AND gate 100 which is disabled when all stations are marking and when only one station is transmitting. However, when the station 15 is transmitting and a spacing signal from another station is coupled by the way of a centralized receiver isolation circuit 150 to a second input terminal 102 of the negative-going AND gate 100, the gate is enabled. An enabled output signal produced by the negative-going diode AND gate 100 at its output terminal 103 is applied through a gate diode D14 to the third input terminal 33 of the send leg 30. When the enabled output signal of the gate 100 is applied, the send leg 30 produces an output spacing signal which is sent through the centralized transmitter 13 and the telephone channel 11 to the station receiver 125 of the station 15. Thus, while the station 15 is transmitting a message, the coupling control circuit 18 is conditioned to pass control signals transmitted by another station directly to the station receiver of station 15 without interfering with the message that station 15 is transmitting to all other stations.

The common network equipment 19 includes the regenerative repeater 40, the receive hub RH, the send hub SH, and a timing hub TH. The basic circuitry of the common network equipment 19 is well known in the prior art. However, some modifications, to be described hereinafter, have been made to adapt it to this invention. The regenerative repeater 40 used in this invention has an input terminal 41 which is connected to the receive hub RH, a first output terminal 42 which is connected to the send hub SH, and a second output terminal 43 which is connected to the timing hub TH. The regenerative repeater is a unilateral transmission device used to retime and retransmit message signals received from a transmitting station and to produce a timed output signal used in conjunction with the coupling control circuits for controlling the coupling of the network stations. The station 15, which has taken control of the network by sending a start space through the positive-going OR gate 60 to enable the positive-going AND gate 70, now maintains control of the network because the timed output signal keeps the gate 60 operated. The timed output signal is applied to the timing hub TH from which it is coupled to the coupling control circuit of each station for blocking the control of the network for a character length regardless of whether mark signals or space signals are subsequently sent by the transmitting station.

Figure 3:
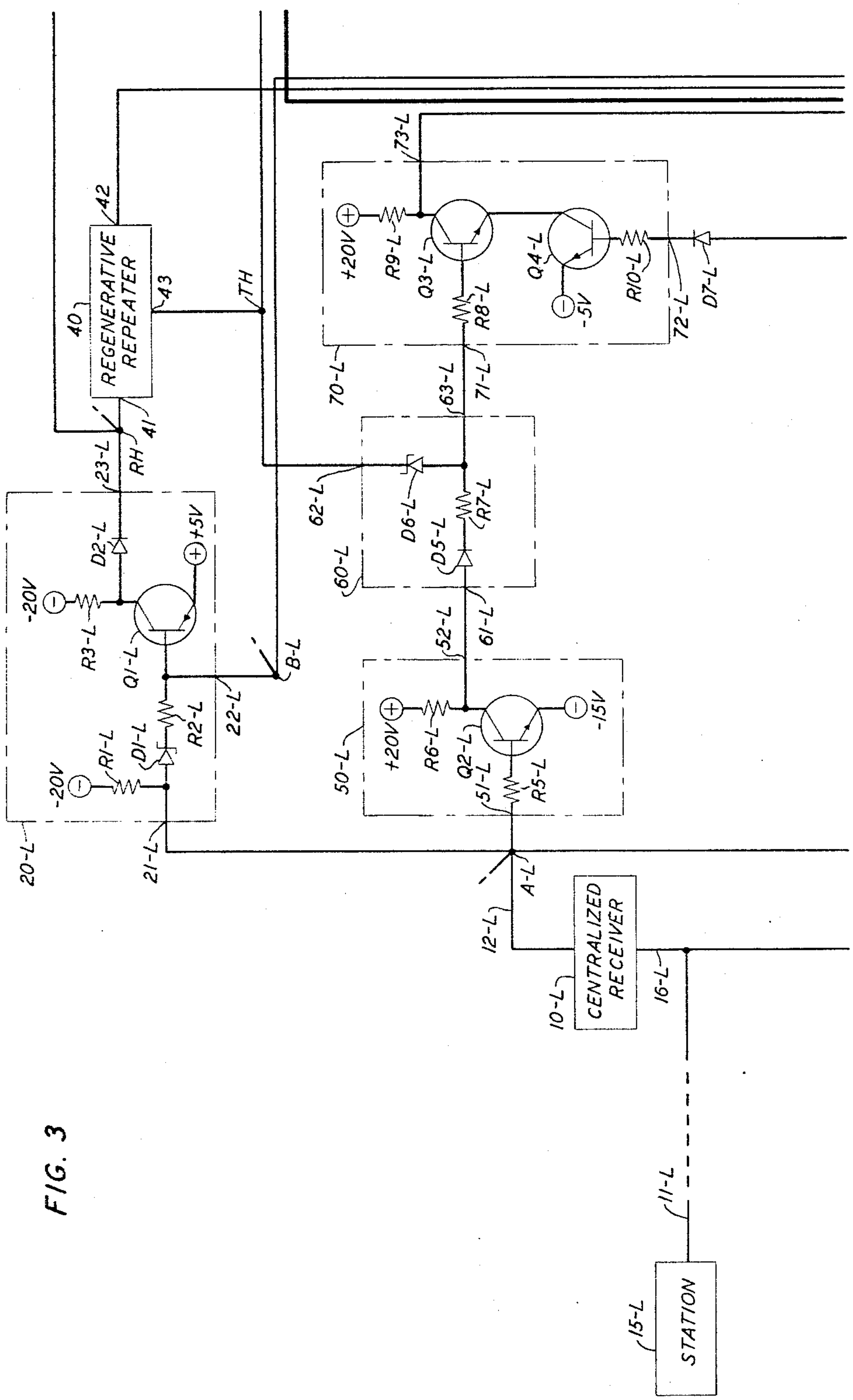
FIGS. 3 and 4 are a schematic diagram of a coupling control circuit for a first station of a telegraph network.
Figure 4:
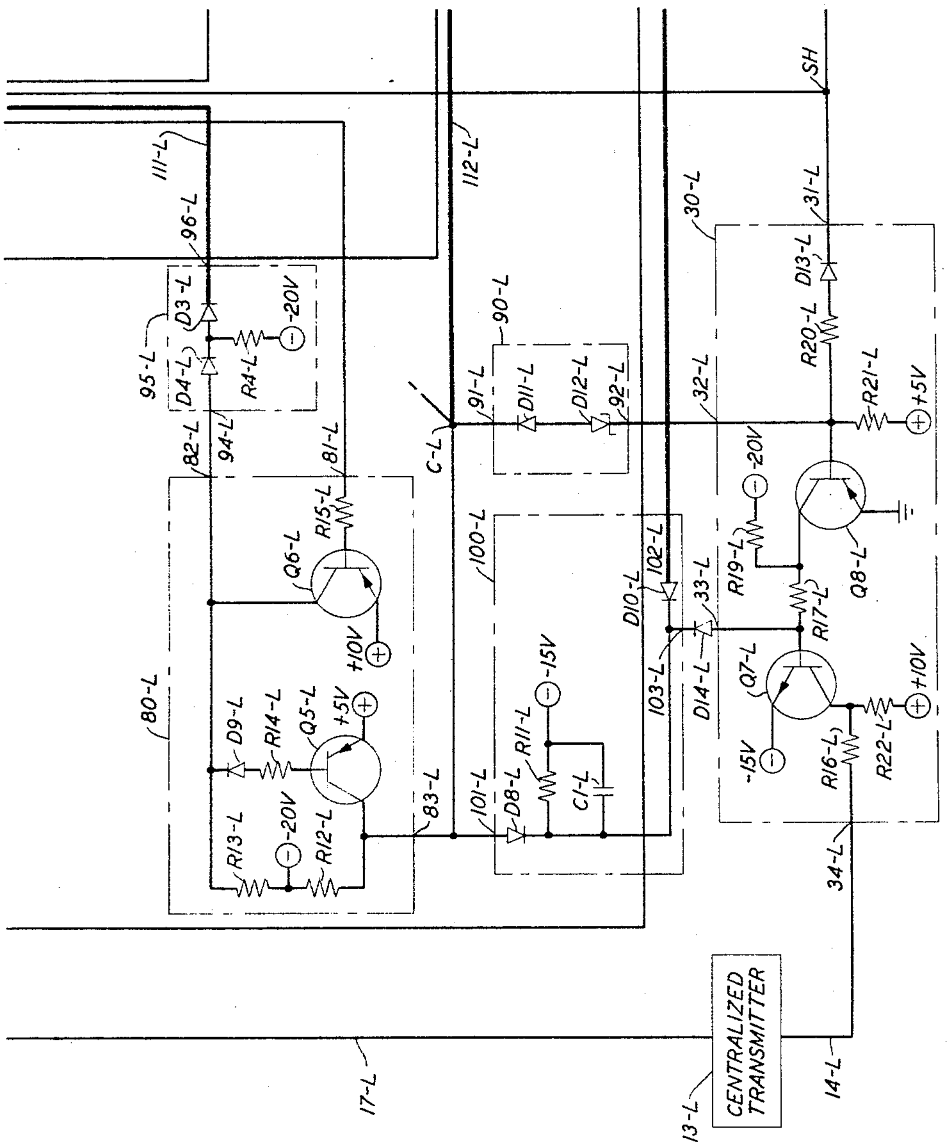
Figure 10:
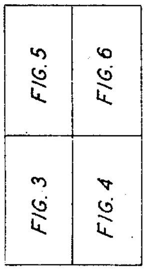
FIG. 10 is a diagram which shows the positioning of FIGS. 3, 4, 5 and 6 in a composite schematic diagram of a two-station telegraph network.

Referring now to FIGS. 3, 4, 5 and 6, which are positioned as shown in FIG. 10, there is shown the equipment of a two-station telegraph network together with interconnecting leads for coupling other central equipment of additional network stations with the two stations shown. Specific voltages for power supplies are advantageously employed in the embodiment of FIGS. 3, 4, 5 and 6 to facilitate the description, but the invention is not considered to be limited thereto. Designations used to identify circuit elements in FIGS. 1 and 2 are applied wherever possible to similar circuit elements in FIGS. 3, 4, 5 and 6. In FIGS. 3 and 4 each designation, postscripted by –L, is used to distinguish equipment, associated with a first station 15–L. Similarly, in FIGS. 5 and 6 each designation, postscripted by –R, is used to distinguish equipment associated with a second station 15–R. The subsequent description is most often applied to elements associated with station 15–L which, for illustrative purposes, is considered to be a transmitting and therefore, a controlling station. However, the description is applicable to all elements of FIGS. 5 and 6 by interchanging all of the position designations of the elements in FIGS. 3 and 4 with the position designations of corresponding elements in FIGS. 5 and 6.

Figure 5:
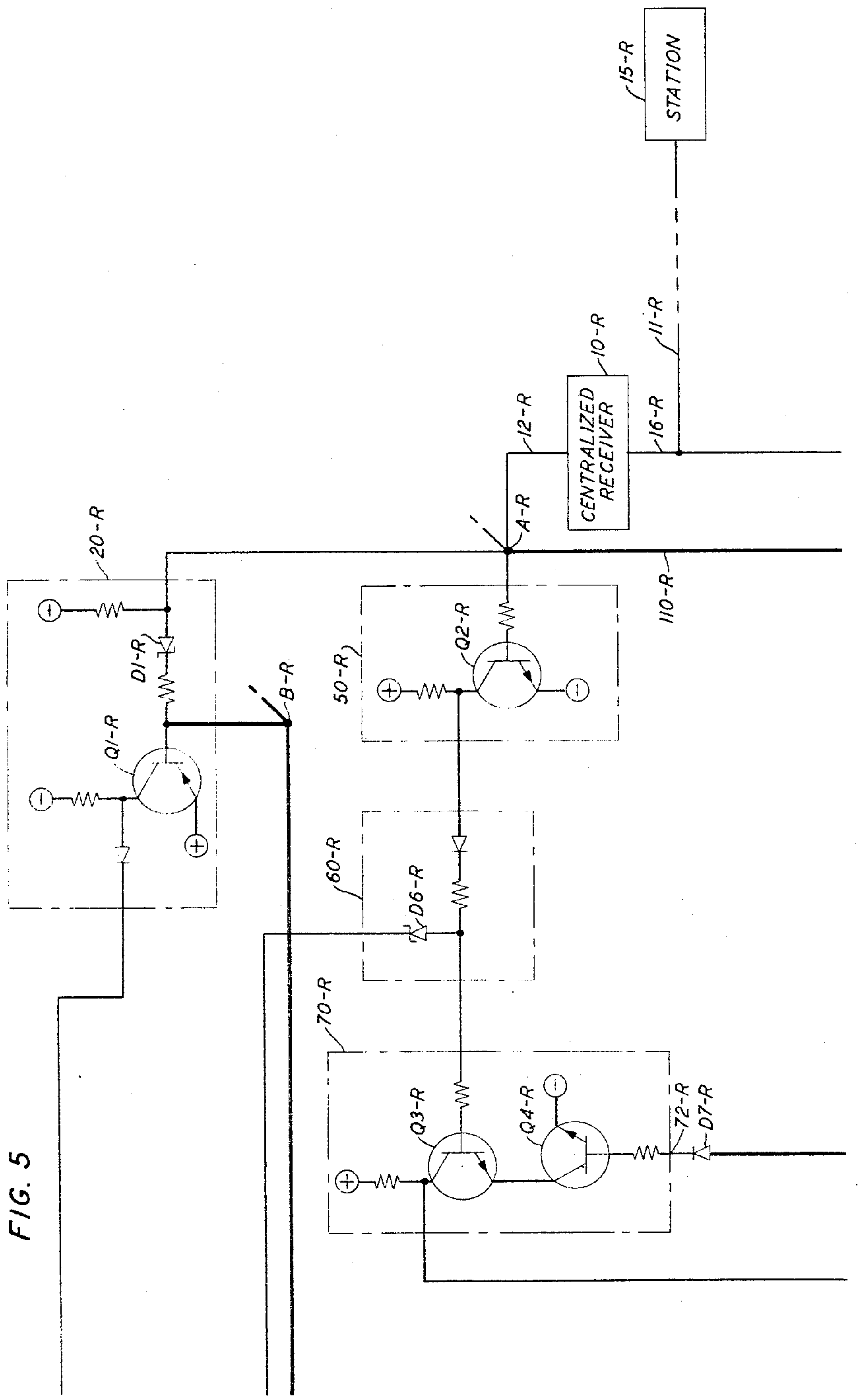
FIGS. 5 and 6 are a schematic diagram of a coupling control circuit for a second station of a telegraph network.
Figure 6:
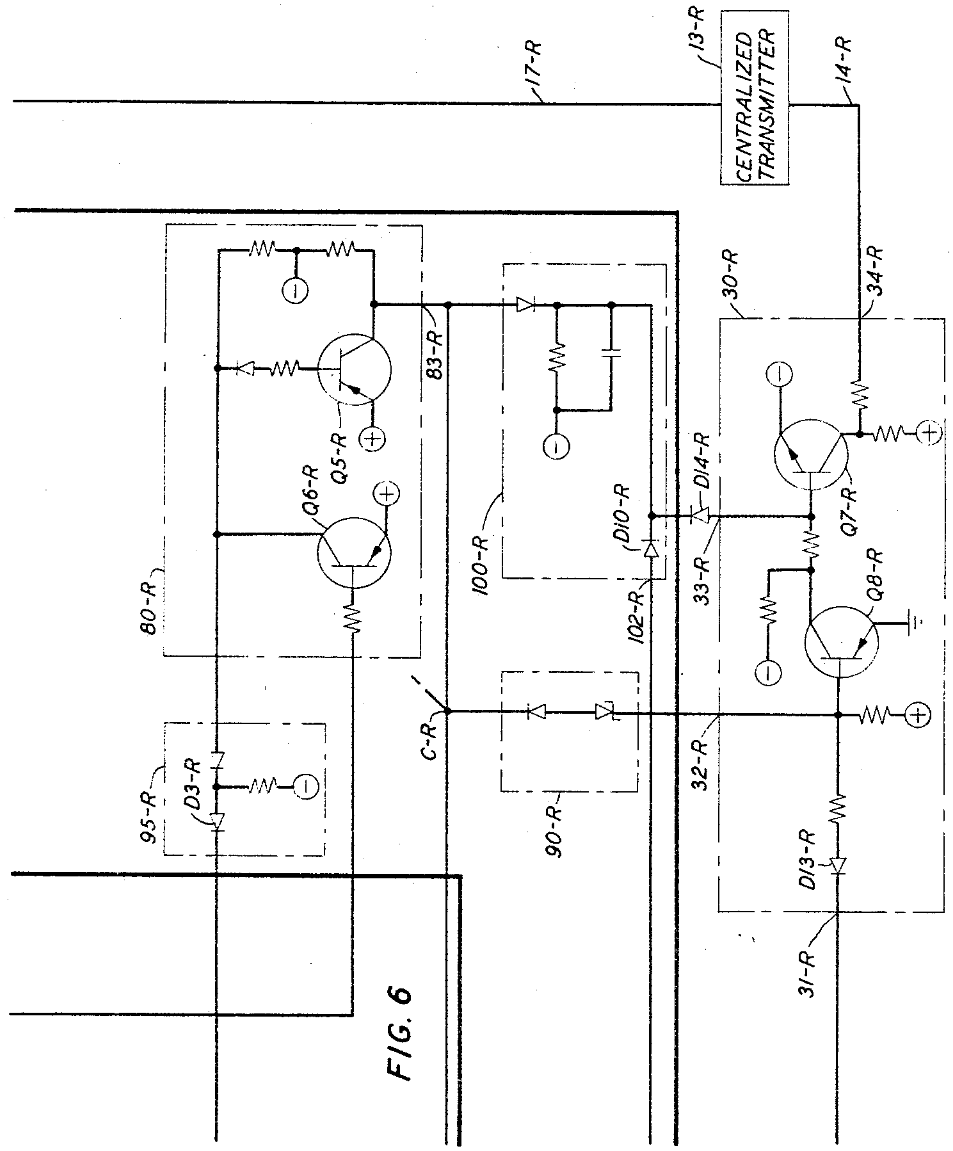

In FIGS. 3 and 4, station 15–L is coupled through a telephone channel 11–L and a lead 16–L to a centralized receiver 10–L. A centralized transmitter 13–L is coupled through a lead 17–L and the telephone channel 11–L to the station 15–L. In FIGS. 5 and 6 the station 15–R is coupled through a telephone channel 11–R and a lead 16–R to a centralized receiver 10–R, and a centralized transmitter 13–R is coupled through a lead 17–R and the telephone channel 11–R to the receiving station 15–R.

In FIG. 3 the centralized receiver 10–L is connected by a lead 12–L to a junction A–L as previously described in FIG. 2. The junction A–L is connected in multiple to a first input terminal 21–L of a receive leg 20–L, to an input terminal 51–L of an inverter 50–L, and to a second input terminal 102–R of a negative-going diode AND gate 100–R in FIG. 6. The first input terminal 21–L of the receive leg 20–L is connected to a junction of the anode of a breakdown diode D1–L and a resistor R1–L, which is coupled through a negative twenty volt potential source to ground. The cathode of the diode D1–L is coupled through a resistor R2–L to the base input electrode of a transistor Q1–L. The transistor Q1–L is a PNP-type transistor which is arranged in a common-emitter configuration and has its emitter electrode coupled through a positive five volt potential source to ground. The output of the transistor Q1–L is taken from its collector electrode which is coupled through a diode D2–L and an output terminal 23–L to the receive hub RH. The collector of the transistor Q1–L is additionally coupled through a series connection of a resistor R3–L and a negative twenty volt potential source to ground. A second input terminal 22–L of the receive leg 20–L is connected to the base electrode of the transistor Q1–L and by way of a junction B–L to the cathode of a diode D3–R in a diode gate 95–R in FIG. 6. Although the operation of the diode D3–R is explained more fully hereinafter, it is now noted that when the station 15–R is idle and marking, the diode D3–R is cut off and therefore is substantially an open circuit. It is additionally noted that when the station 15–R is transmitting and controls the network, the diode D3–R is conducting and thereby applies a positive ten volt potential through the junction B–L to the base of the transistor Q1–L. This positive ten volt potential, called a blocking signal, biases the transistor Q1–L to be cut off regardless of what type of signal the station 15–L transmits. Thus the receive leg 20–L is disabled and blocks signals from the station 15–L from passing through to the receive hub RH.

In the absence of the blocking signal from diode D3–R, the receive leg 20–L is operational and does permit signals from the station 15–L to pass through to the receive hub RH. When the station 15–L is marking, the centralized receiver 10–L applies ground potential to the anode of the diode D1–L which is thereby biased to be cut off. The transistor Q1–L is also cut off and applies a negative potential to the anode of the diode D2–L which is additionally cut off. The receive leg 20–L is therefore cut off from the receive hub RH. When the station 15–L commences transmission by transmitting a start space, the centralized receiver 10–L applies a negative twenty volt potential to the anode of the diode D1–L. This negative potential is sufficient to exceed the reverse breakdown bias necessary for the diode D1–L to conduct heavily and is therefore applied to the base of the transistor Q1–L, which is thereby biased into conduction. When the transistor Q1–L conducts it applies a positive five volt potential to the anode of the diode D2–L and biases the diode to conduct. The positive five volt potential is therefore applied through the diode D2–L and the receive hub RH to the input terminal 41 of the regenerative repeater 40 and turns the repeater on.

The regenerative repeater 40 is of a well-known type which is turned off when it receives no input signal. However, after the regenerative repeater 40 has received a start space from the transmitting station 15–L and is turned on, it stays on for the duration of a character. A time delay of substantially a half of a code element time between input signals and output signals is incorporated in the operation of the regenerative repeater. While the regenerative repeater 40 is turned on it produces at a first output terminal 42, a negative fifteen volt potential whenever the repeater is regenerating a marking signal and a ground potential whenever the repeater is regenerating a spacing signal. When the repeater is turned off it produces a negative fifteen volt potential at the first output terminal 42. These potentials are applied directly to the send hub SH. The regenerative repeater 40 has a second output terminal 43, which is derived from an internal timing circuit of the regenerative repeater known in the prior art. While the regenerative repeater 40 is turned on, it produces at the second output terminal 43 a positive potential of substantially twelve volts. Whenever the repeater is turned off the potential at the second output terminal 43 is at a substantially ground potential. The potential of the second output terminal 43 is applied through the timing hub TH to all coupling control circuits for indicating whether or not the regenerative repeater 40 has been turned on by a station. When a station commences transmission and turns on the repeater, the positive potential on the timing hub TH maintains control of the coupling of all stations for the transmitting station until that station ceases to transmit.

In FIG. 4, the send leg 30–L has a first input terminal

31–L connected to the send hub SH. Within the send leg 30–L the first input terminal 31–L is connected to the cathode of a diode D13–L. The anode of the diode D13–L is coupled through a resistor R20–L to the base electrode of a PNP-type transistor Q8–L. The base electrode of the transistor Q8–L is additionally coupled both to a second input terminal 32–L of the send leg 30–L and through a series connection of a resistor R21–L and a positive five volt potential source to ground. The transistor Q8–L is connected in a grounded-emitter configuration with the output being taken from its collector electrode, which is coupled through a series connection of a resistor R19–L and a negative twenty volt potential to ground. The output of transistor Q8–L is coupled through a resistor R17–L to the base electrode of an NPN-type transistor Q7–L. A third input terminal 33–L of the send leg 30–L is also connected to the base of the transistor Q7–L, which is arranged in a common-emitter configuration in which the emitter electrode is coupled through a negative fifteen volt potential source to ground. The output of the transistor Q7–L is taken from its collector electrode, which is coupled through a series connection of a resistor R22–L and a source of positive ten volt potential to ground. The output of the transistor Q7–L is coupled through a resistor R16–L to an output terminal 34–L of the send leg 30–L. This output terminal 34–L is connected by a lead 14–L to the input of the centralized transmitter 13–L.

During the operation of the stations 15–L and 15–R there are four combinations of send leg input states which produce one of two output states at the output terminal 34–L. In illustration of these combinations, a first combination of input states results from both stations 15–L and 15–R marking, and has both the input terminal 32–L and the input terminal 33–L of the send leg 30–L cut off from the coupling control circuit, respectively, by a diode threshold gate 90–L and by a gate diode D14–L. The input terminal 31–L and the cathode of the diode D13–L have a negative fifteen volt potential applied to them by the send hub SH. The diode D13–L is sufficiently forward biased to conduct and to apply a negative potential to the base of the transistor Q8–L. This negative potential is sufficient to bias the transistor to conduct in saturation and effectively ground its output. A ground potential is thereby applied to the base of the transistor Q7–L which is biased to conduct in saturation. Thus the output of the transistor Q7–L is clamped to the negative fifteen volt bias of its emitter circuit. This negative fifteen volt potential is dropped by approximately five volts across the resistor R16–L to a negative ten volts at the receive leg output terminal 34–L where it represents a marking signal.

A second combination of input states results when the station 15–L is idle and marking, and the station 15–R is sending a spacing signal. The input terminal 32–L and the input terminal 33–L of the send leg 30–L are cut off as previously described. The input terminal 31–L and the cathode of the diode D13–L now have a ground potential from the send hub SH applied to them. The diode D13–L is sufficiently forward biased to conduct and to apply a positive potential to the base electrode of the transistor Q8–L. Thus the transistor Q8–L and thereby the transistor Q7–L are biased to be cut off. When the transistor Q7–L is cut off, its collector is clamped to the positive ten volt bias of the collector circuit. This positive ten volt potential is dropped by three volts across the resistor R16–L to a positive seven volts at the receive leg output terminal 34–L where it represents a spacing signal.

A third combination of input states to the receive leg 20–L results when the station 15–L is transmitting a message including both marking and spacing signals to the station 15–R. In this combination a negative twenty volt potential is applied to the input terminal 32–L and the input terminal 33–L is cut off. The input 31–L can have either a negative fifteen volt potential or a ground potential applied to it without affecting the output potential. The diode D13–L is biased to be cut off, but the negative potential applied through the input terminal 32–L to the base electrode of the transistor Q8–L biases that transistor to conduct. The transistor Q7–L therefore conducts and produces a marking potential at the output terminal 34–L of the send leg 30–L. Therefore the message sent by station 15–L and regenerated by the regenerative repeater 40 is not sent back to the station 15–L.

A fourth combination of input states to the receive leg 30–L results when the station 15–L is sending a message and the station 15–R seeks control of the network. A negative twenty volt potential is applied to the input terminal 32–L and a negative fifteen volt potential spacing signal is applied by way of a lead 110–R, the negative-going diode AND gate 100–L, and the gate diode D14–L to the input terminal 33–L. Again in this combination the input terminal 31–L can have either a negative fifteen volt potential or a ground potential applied to it without affecting the output potential state. The negative fifteen volts at the input terminal 33–L is applied to the base electrode of the transistor Q7–L and thereby the transistor Q7–L is biased to be cut off so that it produces a spacing signal at the output terminal 34–L.

In FIG. 3 the transistor inverter gate 50–L is a circuit having an input terminal 51–L which is connected to the junction A–L and having an output terminal 52–L which is taken from the collector of an NPN transistor Q2–L. The input terminal 51–L is coupled through a resistor R5–L to the base of the transistor Q2–L which is connected in a common-emitter configuration. The emitter is coupled through a source of negative fifteen volt potential to ground, and the collector electrode is coupled through a series connection of a resistor R6–L and a source of twenty volt potential to ground. When a marking signal of ground potential from the junction A–L is applied to the input terminal 51–L, the transistor Q2–L is biased to be conducting and produces a negative fifteen volt potential at its output terminal 52–L. When a spacing signal of a negative twenty volt potential from the junction A–L is applied to the input terminal 51–L, the transistor Q2–L is biased to be cut off and produces a positive twenty volt potential at its output terminal 52–L.

In FIG. 3 the positive-going diode OR gate 60–L is similar to those well known in the prior art having two inputs and an output. A first input terminal 61–L is coupled to the anode of a diode D5–L and is directly connected to the output terminal 52–L of the transistor inverter 50–L. A second input terminal 62–L is coupled to the cathode of a reverse breakdown diode D6–L and is connected to the timing hub TH. The cathode of the diode D5–L is coupled by way of a resistor R7–L to the anode of the diode D6–L. An output terminal 63–L of the positive-going diode OR gate 60–L is taken from the anode of the diode D6–L. When a substantial positive potential is applied to either the first input terminal 61–L or the second input terminal 62–L, the particular diode to which the potential is applied will conduct and produce a potential at the output terminal 63–L of essentially the same positive value as that applied to the input terminal. When a negative potential is applied to the first input terminal 61–L and a ground potential is applied to the second input terminal 62–L, the diodes D5–L and D6–L are biased to be cut off and therefore effectively present an open circuit at the output terminal 63–L.

The transistor AND gate 70–L, as previously mentioned in the description of FIG. 2, is in a series configuration having two inputs through the base electrodes of two NPN-type transistors, each of which is connected in a common-emitter configuration. In FIG. 3 a first input terminal 71–L of the transistor AND gate 70–L is connected to the output terminal 63–L of the diode OR gate 60–L. The first input terminal 71–L is coupled through a resistor R8–L to the base electrode of a first transistor Q3–L. A second input terminal 72–L is connected to the cathode of a gate diode D7–L. The anode of the gate diode D7–L is directly connected to a junction C–R, as shown in FIG. 6, in the coupling control circuit of station 15–R. In FIG. 3 the second input terminal 72–L is coupled through a resistor R10–L to the base electrode of a second transistor Q4–L. The emitter electrode of the first transistor Q3–L is directly connected to the collector electrode of the second transistor Q4–L. The emitter electrode of the second transistor Q4–L is coupled through a source of negative five volt potential to ground. The collector of the first transistor Q3–L is coupled by way of a resistor R9–L and a source of positive twenty volt potential to ground. An output terminal 73–L of the transistor AND gate 70–L is taken from the collector electrode of the first transistor Q3–L. When either the first input terminal 71–L or the second input terminal 72–L is cut off by an open circuit condition, the transistor AND gate 70–L is disabled and produces a positive twenty volt potential at the output terminal 73–L. These conditions occur when both stations are marking and the input 71–L is cut off. These conditions additionally occur when station 15–R is transmitting to station 15–L and the input 72–L is cut off. The only condition under which the potential at the output terminal 73–L changes is when a substantially positive potential is applied to both the first input terminal 71–L and the second input terminal 72–L. This condition occurs when station 15–L is transmitting and station 15–R is receiving. Then the transistor AND gate 70–L is enabled and produces a negative five volt potential at the output terminal 73–L.

The logic amplifier 80–L, previously mentioned in the description of FIG. 2, has an input and two outputs. As shown in FIG. 4 the logic amplifier 80–L has two PNP-type transistors which are arranged in common-emitter configurations. A first transistor Q5–L is biased to be normally conducting by having its emitter electrode coupled through a source of positive five volt potential to ground and by having its base electrode coupled by way of a resistor R14–L to the anode of a diode D9–L which is biased to be normally conducting. The collector electrode of the transistor Q5–L is coupled through a series connection of a resistor R12–L and a source of negative twenty volt potential to ground. The collector electrode of a second transistor Q6–L is connected directly to the cathode of the diode D9–L and is coupled through a series connection of a resistor R13–L and a source of negative twenty volt potential to ground. The emitter electrode of the transistor Q6–L is coupled through a source of positive ten volt potential to ground. The base electrode of the second transistor Q6–L is coupled through a resistor R15–L to an input terminal 81–L of the logic amplifier 80–L. The input terminal 81–L is connected directly to the output terminal 73–L of the transistor AND gate 70–L. The transistor Q6–L is normally biased to be cut off because there is a positive twenty volt potential applied to the input terminal 81–L from the output terminal 73–L of the transistor AND gate 70–L as long as that gate is disabled. A first output terminal 82–L is taken at the collector electrode of the transistor Q6–L. The potential of the first output terminal 82–L is a negative twenty volts when the transistor Q6–L is cut off. A second output terminal 83–L is taken from the collector electrode of transistor Q5–L. The potential of the second output terminal 83–L is a positive five volts when the transistor Q5–L is conducting. When the transistor AND gate 70–L is enabled, the potential applied to the input terminal 81–L changes to a negative five volts and biases the transistor Q6–L to conduct. Thus a positive ten volt potential is produced at the first output terminal 82–L. The diode D9–L and the transistor Q5–L are thereby biased to cut off, and the potential at the second output terminal 83–L changes to a negative twenty volts.

The first output terminal 82–L of the logic amplifier is coupled through the diode gate 95–L and a lead 111–L to a junction B–R, in FIG. 5, of the coupling control circuit of the station 15–R. In FIG. 4 the diode gate 95–L includes a first diode D4–L, having its cathode connected directly to the anode of a second diode D3–L and coupled through a series connection of a resistor R4–L and a source of negative twenty volt potential to ground. An input terminal 94–L of the diode gate 95–L is directly connected to the anode of the diode D4–L and to the first output terminal 82–L of the logic amplifier 80–L. An output terminal 96–L of the diode gate 95–L is directly connected to the cathode of the diode D3–L and by way of the lead 111–L to the junction B–R in FIG. 5. In FIG. 4 the diode gate 95–L is normally biased to be cut off when the transistor Q6–L is cut off. When the station 15–L is transmitting a message, under control of the timing hub TH by way of the positive-going OR gate 60–L and the transistor AND gate 70–L, the transistor Q6–L then applies a positive potential to the diode gate 95–L thereby causing both of the diodes D4–L and D3–L to conduct. Thus a positive potential of substantially ten volts is applied to the junction B–R in the FIG. 5. This positive potential is then applied to the base of the transistor Q1–R which is thereby biased to be cut off. This potential is used to disable the receive leg 20–R as long as the station 15–L is transmitting and has control of the network so that spacing signals from the station 15–R cannot be transmitted to the receive hub RH. The previously mentioned diode D3–R operates when the station 15–R is transmitting in a manner similar to the description of the diode D3–L.

In FIG. 4, a junction C–L is directly connected to the output terminal 83–L of the logic amplifier 80–L and in multiple to an input terminal 91–L of a diode threshold gate 90–L, to a first input terminal 101–L of a negative-going diode AND gate 100–L, by way of a lead 112–L to the anode of a gate diode D7–R, in FIG. 5.

The diode threshold gate 90–L includes a diode D11–L which has its cathode connected to the input terminal 91–L. The anode of diode D11–L is directly connected to the anode of a breakdown diode D12–L, which has its cathode coupled through an output terminal 92–L to the second input terminal 32–L of the receive leg 30–L. Under normal conditions when the station 15–L is marking and the transistor Q5–L is conducting, a positive potential of substantially five volts is applied to the junction C–L biasing the diode threshold gate 90 to be cut off and causing the gate diode D7–R, in FIG. 5, to conduct. When the diode D–7 conducts, it applies the five volt potential to a second input terminal 72–R of the transistor AND gate 70–R in FIG. 5. While the station 15–L is transmitting and controlling the network, the transistor Q5–L is cut off and a negative twenty volt potential is applied to the input terminal 91–L of the diode threshold gate 90–L, as well as through the lead 112–L to the anode of the diode D7–R, which is biased to be cut off. This negative potential is sufficient to exceed the breakdown potential of the breakdown diode D12–L so that the diode threshold gate 90–L conducts. Thus a negative potential is applied through the diode threshold gate 90–L and the second input terminal 32–L of the receive leg 30–L to bias the transistor Q8–L into conduction as long as the station 15–L maintains control of the network.

Additionally, in FIG. 4, a negative-going diode AND gate 100–L includes a first diode D8–L and a second diode D10–L, both of which have their cathodes directly connected to an output terminal 103–L. The output terminal 103–L is additionally coupled through a series combination of a resistor R11–L and a source of negative fifteen volt potential to ground. The first input terminal 101–L of the diode AND gate 100–L is coupled to the anode of the first diode D8–L, and a second input terminal 102–L is coupled to the anode of the second diode D10–L through the lead 110–R to a junction A–R in FIG. 5. When a negative potential is applied to the first input terminal 101–L and to the second input terminal 102–L while the station 15–L is controlling the network and station 15–R is sending a spacing signal, the diodes D8–L and D10–L are biased to be cut off producing a negative potential at the output terminal 103–L. When a potential other than a negative potential is applied to either input terminal, such as when station 15–L is receiving or when station 15–L is in control and station 15–R is not sending a spacing signal, the diode to which the potential is applied conducts and produces a near ground potential at the output terminal 103–L. A capacitor C1–L is in a shunt circuit with the resistor R11–L. The resistor and capacitor are chosen to have a time constant which insures that a negative potential applied to the output terminal 103–L will persist uninterrupted for approximately a half of a code element time.

The output terminal 103–L is coupled through a gate diode D14–L to the third input terminal 33–L of the receive leg 30–L. The gate diode D14–L is poled to conduct current toward the output terminal 103–L. Whenever the station 15–L is receiving and when the station 15–L is transmitting and the station 15–R is receiving, the diode D14–L is biased to be cut off. However, when the station 15–L is transmitting and the station 15–R signals to take over control of the network from the station 15–L, the potential on the output terminal 103–L changes to a substantial negative value. Then the diode D14–L conducts and applies that negative potential to the base of the transistor Q7–L. The transistor Q7–L will thereby be biased to be cut off and produce a spacing signal at its output terminal 34–L as previously described.

There are three conditions of message signaling possible in this two-station network. A first condition is having both stations marking. A second condition is having one station, such as the station 15–L, spacing as a transmitting station while the receiving station 15–R is marking. A third condition is having the receiving station 15–R become a transmitting station by sending a start space while the station 15–L is transmitting.

In the first condition when both stations in the network are marking, a marking signal of ground potential from the centralized receiver 10–L is applied through the junction A–L to the diode D1–L which is cut off. Similarly, the station 15–R is marking so that the diode D1–R is cut off. Therefore, the receive legs of both stations are cut off and no signal from either station reaches the receive hub RH. When no signal reaches the receive hub RH, the regenerative repeater has no input signal and therefore is turned off.

The marking signal from the station 15–L is also applied to the transistor inverter 50–L which is biased to be conducting. A negative potential from the output of the transistor inverter 50–L is applied to the positive-going diode OR gate 60–L and the diode D5–L is biased to be cut off. The second output terminal 43 of the regenerative repeater 40 produces a substantially ground potential because the repeater is turned off, and that potential is applied to the positive-going diode OR gate 60–L biasing the diode D6–L to cut off. Thus both inputs to the positive-going diode OR gate 60–L are cut off and therefore the gate itself is cut off producing a substantially open circuit condition.

The transistor AND gate 70–L, which is cut off in the absence of a positive bias on both of its input terminals, is now cut off and applies a positive potential to the input of the logic amplifier 80–L biasing the first transistor Q6–L to be cut off. The normally negative potential output signal from the first output terminal 82–L of logic amplifier 80–L is applied to the diode gate circuit 95–L, which is cut off. The normally positive potential output signal from the second output terminal 83–L of the logic amplifier 80–L is applied to the diode threshold gate 90–L, to the negative-going diode AND gate 100–L, and through the lead 112–L to the anode of the diode D7–R in FIG. 5. Thus, as previously described, the diode threshold gate 90–L is biased to be cut off and the diode D7–R is biased to be conducting. In a similar manner to the previous description, the transistor AND gate 70–R and the diode threshold gate 90–R are cut off, and the diode D7–L is biased to conduct. Thus neither station has taken control of the network, but each station conditions the other station by way of the bias on the diodes D7–L and D7–R to take control when one transmits.

With both stations marking the marking signals of ground potential are additionally applied by way of the junction A–L to a second input terminal 102–R of the diode AND gate 100–R in FIG. 6 and by way of the junction A–R to the second input terminal 102–L of the diode AND gate 100–L in FIG. 4. These input potentials concur with the previously mentioned positive input potential at the first input terminal to each diode AND gate and produce a substantially ground potential at the output terminals 103–L and 103–R, and bias the diodes D14–L and D14–R to be cut off.

The send leg 30–L and the send leg 30–R have a negative marking potential applied to their first input terminals 31–L and 31–R while their other inputs are cut off. Therefore, as previously described, the send legs 30–L and 30–R both produce marking signals at their output terminals 34–L and 34–R. These marking signals are transmitted respectively to the stations 15–L and 15–R.

In the second condition of message signaling when the transmitting station 15–L sends a start space and the receiving station 15–R is marking, a negative potential of twenty volts is applied through the junction A–L to the receive leg 20–L. This negative potential enables the receive leg which applies a positive potential to the input of the regenerative repeater 40 turning it on. The negative potential start space is additionally applied to the inverter 50–L and to the second input terminal 102–R of the diode AND gate 100–R. The inverter 50–L is cut off and produces a positive potential which is applied to the positive-going diode OR gate 60–L. This positive potential biases the diode OR gate 60–L into conduction and thereby applies a positive potential to the first input terminal 71–L of the transistor AND gate 70. As previously described, the regenerative repeater 40, which was turned on by the start space from the station 15–L remains on for an interval equal to a character length in time.

The regenerative repeater 40 produces a sufficiently high positive potential from the output terminal 43 that the breakdown diodes D6–L and D6–R are biased to conduct. This positive potential is a signal which implements control of the coupling of network equipment in the following manner under the direction of the station 15–L for the duration that station 15–L continues transmitting. The diode D6–L conducts and applies the positive potential to the transistor AND gate 70–L. Since the station 15–R is marking, its inverter 50–R, positive-going diode AND gate 60–R, transistor AND gate 70–R, and logic amplifier 80–R have the same output potentials previously described when both stations are marking. Therefore, the junction C–R of the coupling control circuit of the station 15–R also applies a positive potential to the transistor AND gate 70–L. There is now a positive potential applied to both of the input terminals of the transistor AND gate 70–L and the potential of its output terminal 73–L changes to a negative five volt potential. This negative potential is applied to the logic amplifier 80–L biasing the transistor Q6–L to conduct and thereby switches the potential of the output terminals 82–L and 83–L. In this switched condition the first output terminal 82–L has a positive potential of ten volts and the second terminal 83–L has a negative potential of twenty volts. The positive potential from the first output terminal 82–L is applied by way of the diode gate 95–L, the lead 111–L, and the junction B–R to clamp the base electrode of the transistor Q1–R to cut off. Thereby the receive leg 20–R is disabled so that station 15–R cannot transmit a spacing signal to the input terminal 41 of the regenerative repeater 40 during the interval in which the station 15–L is transmitting.

The negative potential from the second output terminal 83–L of the logic amplifier 80–L is applied by way of the junction C–L and the lead 112–L to the diode D7–R which is biased to be cut off. While the diode D7–R is cut off, the transistor AND gate 70–R of the station 15–R is disabled. The negative potential from the junction C–L which exceeds the breakdown potential of the diode D12–L is also applied by way of the diode threshold gate 90–L to the second input terminal 32–L of the send leg 30–L, as previously described in the description of the send leg 30–L.

Additionally, the negative potential from the junction C–L is applied to the first input terminal 101–L of the diode AND gate 100–L. The second input terminal 102–L of the diode AND gate 100–L has a marking signal of substantially ground potential applied from the junction A–R in FIG. 5 by way of the lead 110–R. The diode D10–L conducts and produces a substantially ground potential at the output terminal 103–L. The diode D14–L is thereby biased to be cut off.

The negative potential which is applied to the second input terminal 32–L of the send leg 30–L ensures that the transistor Q8–L is biased to conduct regardless of the signal potential applied to the first input terminal 31–L. When the transistor Q8–L conducts it maintains the transistor Q7–L conducting. When the transistor Q7–L is conducting a marking signal is continuously transmitted to the station 15–L. Thus the station 15–L has taken control of the coupling of the two stations and message signals are routed as follows.

A start space and subsequent spacing signals, generated by the regenerative repeater 40, are ground potential signals which are applied through the send hub SH to the first input terminals 31–L and 31–R of the send legs. Because the output signals from the regenerative repeater 40 are delayed as previously described, they are not transmitted back to the first transmitting station 15–L, where they would garble the local copy of the printed message. The spacing signals are prevented from being transmitted back to the station 15–L by the transistors Q7–L and Q8–L which are biased to conduct because of the control signal applied through the second input 32–L.

When the start space signal from the send hub SH is applied to the first input terminal 31–R of the send leg 30–R, it concurs with cut-off conditions at the input terminals 32–R and 33–R. The signal produced by the second output terminal 43 of the regenerative repeater and applied through the timing hub TH maintains the transistor AND gate 70–L enabled, the logic amplifier 80–L switched and thereby the transistor AND gate 70–R disabled. Thus it is ensured that the cut-off conditions on the input terminals 32–R and 33–R persist in the coupling control circuit of station 15–R for the interval of a complete character, even though a series of marking signals of ground potential and spacing signals of negative potential are applied to the junction A–L. When the station 15–L sends a marking signal within the character time in which the regenerative repeater 40 is turned on, the repeater applies a ground potential to the send hub SH, and the send leg 30–R produces a marking potential at its output terminal 34–R. When the station 15–L sends a spacing signal within that character time, the regenerative repeater 40 applies a negative potential to the send hub SH, and the send leg 30–R produces a spacing signal at its output terminal 34–R. These marking and spacing signals are transmitted to the receiving station 15–R.

In order to establish the third condition, the transmitting station 15–L is sending and has control of network coupling, and the regenerative repeater 40 is turned on. Concurrently a break signal is sent from the receiving station 15–R, which becomes a transmitting station. This break signal of a negative twenty volts is transmitted through a lead 110–R to the second input terminal 102–L of the negative-going diode AND gate 100–L, in FIG. 4, and biases the diode D10–L to be cut off. The first input terminal 101–L of the negative-going diode AND gate 100–L is also biased to cut off the diode D8–L as previously described. The potential of the output terminal 103–L changes to a negative fifteen volts which is applied through the diode D14–L to the base electrode of the transistor Q7–L. The transistor Q7–L therefore is biased to be cut off and sends a spacing signal through the lead 14–L to the centralized transmitter 13–L. This signal and any spacing signals which follow from station 15–R will be printed by the printer at the transmitting station 15–L. Thus the station 15–R is able to transmit to the station 15–L without having the message go through the regenerative repeater 40. It is noted that the signals of this message therefore are not retimed, but the accuracy of a message sent in this manner usually is not as critical as the accuracy of a message sent in the regular manner. Because of the selected arrangement of the network, the station 15–R commences transmission with a break signal which disables the transmitter of station 15–L as previously described. Thereafter the station 15–R takes control of the network by continuing to transmit a message informing the station 15–L of existing trouble. It is obvious that the conditions of message signaling can be interchanged between stations 15–L and 15–R so that either one becomes the transmitting station while the other assumes the role of the receiving station.

In addition to operation of a network with two stations it is also possible to operate a network with three or more stations. The following description covers the addition of a third station, but other stations are added similarly. As shown in FIG. 2, it is necessary to add to the coupling control circuits shown in FIGS. 3, 4, 5 and 6, a logic amplifier isolation circuit 130, a receive leg isolation circuit 140, and a centralized receiver isolation circuit 150 for each coupling control circuit. These circuits are added to the network to produce coupling control conditions for each network station similar to those used in a two-station network without having a change of conditions at one station cause an undesired condition at another station through a common connection. The designations of elements used in FIGS. 1, 2, 3, 4, 5 and 6, are applied wherever possible to the FIGS. 7, 8 and 9.

Figure 7:
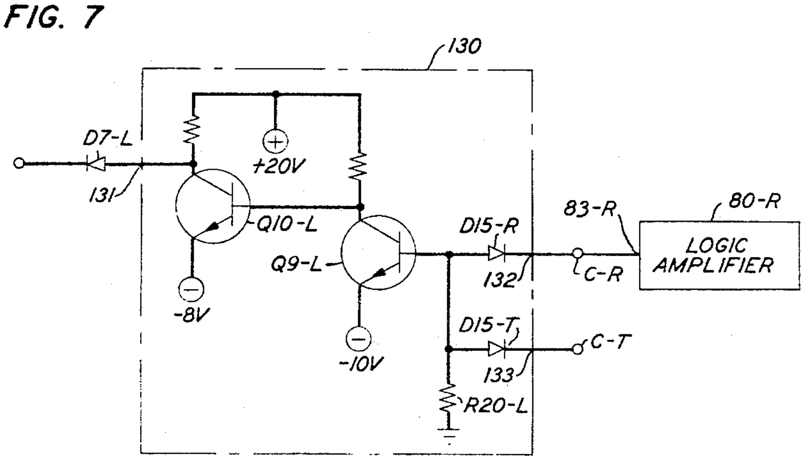
FIG. 7 is a schematic diagram of a logic amplifier isolation circuit.

In FIG. 7 there is shown a logic amplifier isolation circuit 130 which has an output terminal 131 connected to the anode of a diode D7–L of a first coupling control circuit associated with a first station 15–L, a first input terminal 132 connected to a junction C–R of a second coupling control circuit associated with a second station 15–R, and a second input terminal 133 which is connected to a junction C–T of a third coupling control circuit associated with a third station 15–T. This logic amplifier isolation circuit 130 replaces a direct connection between the junction C–R and the diode D7–L as shown in FIGS. 3, 4, 5, and 6, and accommodates the additional station 15–T, which is not shown. The input terminals 132 and 133 are respectively connected to the cathodes of a pair of diodes D15–R and D15–T. The anodes of the diodes D15–R and D15–T are coupled in common through a resistor R20–L to ground. The anodes are additionally coupled to the base input electrode of a transistor Q9–L. The transistor Q9–L and a transistor Q10–L are inverters which provide two distinct potential states from the output of the transistor Q10–L for operating the diode D7–R.

In operation of a three station-network, consider that the second station 15–R is marking and the transistor Q5–R of its coupling control circuit is therefore conducting. There is a positive five volt potential applied by the output terminal 83–R of the logic amplifier 80–R to the input terminal 132 to bias the diode D15–R to be cut off. Likewise the third station 15–T is marking and the diode D15–T is cut off. Thus both of the stations 15–R and 15–T are marking and ground potential is applied to the base of the transistor Q9–L which conducts. The transistor Q10–L is thereby biased to be cut off so that it applies a positive potential greater than five volts to the anode of the diode D7–L, enabling the station 15–L to take control of the network.

When the second station 15–R spaces, the potential at the output terminal 83–R changes to a negative twenty volts and the diode D15–R conducts. The transistor Q9–R is thereby biased to be cut off and produces a bias which makes the transistor Q10–L conduct. When the transistor Q10–L conducts, it applies a negative eight volt potential to the diode D7–L to bias the diode D7–L to be cut off so that the station 15–L cannot take control of the network. While the station 15–R is spacing, the station 15–T continues marking and its logic amplifier output terminal 83–T is isolated by the diode D15–T from the change of potential on the output terminal 83–R which commenced the changes causing the diode D7–L to be cut off. In a similar manner the station 15–T can be spacing while the station 15–L is marking. Thus either the second station 15–R or the third station 15–T produces the same control conditions on the diode D7–L in the coupling control circuit of the first station 15–L as previously described for a two-station network.

Figure 8:
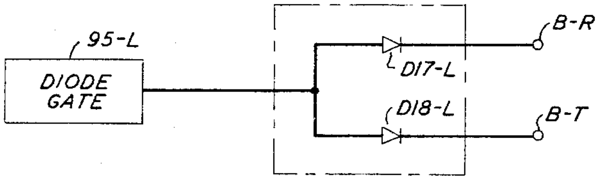
FIG. 8 is a schematic diagram of a receive leg isolation circuit.

Referring now to FIG. 8, there is shown a receive leg isolation circuit, which includes two diodes D17–L and D18–L that have their anodes connected in common to a diode gate 95–L of a first coupling control circuit associated with a first station 15–L. The cathode of the diode D17–L is connected directly to a junction B–R of a second coupling control circuit associated with a second station 15–R. The cathode of the diode D18–L is connected directly to a junction B–T of a third coupling control circuit associated with a third station 15–T. This receive leg isolation circuit replaces the lead 111–L shown in the schematic diagram of FIGS. 3, 4, 5 and 6, and accommodates the additional station 15–T. Any change of potential at the junction B–R caused by the station 15–R marking or spacing is applied to the diode gate 95–L as previously described relative to FIGS. 3, 4, 5 and 6. This change of potential is isolated from the junction B–T so that the operation of the third station 15–T is unchanged by a potential change at the junction B–R. In a similar manner a change of potential at the junction B–T caused by the station 15–T marking or spacing is isolated from the junction B–R.

Figure 9:
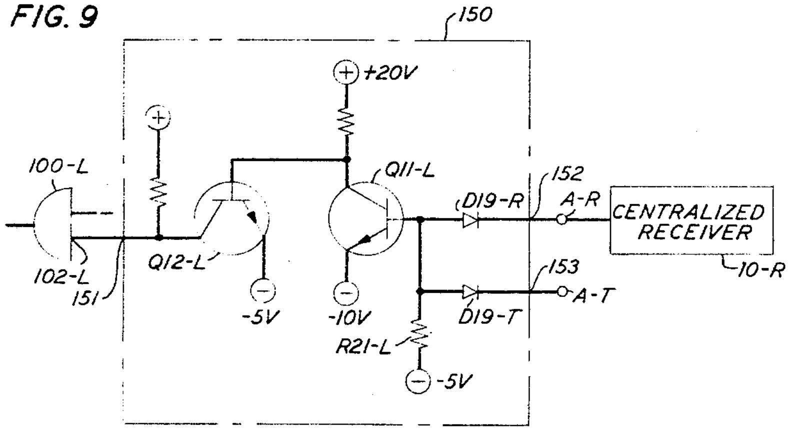
FIG. 9 is a schematic diagram of a centralized receiver isolation circuit.

Referring now to FIG. 9, there is shown a centralized receiver isolation circuit, which has an output terminal 151 connected to a second input terminal 102–L of a negative-going diode AND gate 100–L in a first coupling control circuit associated with a first station 15–L, a first input terminal 152 connected to a junction A–R of a second coupling control circuit associated with a second station 15–R, and a second input terminal 153 connected to a junction A–T of a third coupling control circuit associated with a third station 15–T. The centralized receiver isolation circuit replaces the lead 110–R as shown in FIGS. 3, 4, 5 and 6, and accommodates the additional station 15–T. This circuit is arranged to function similar to the previously described logic amplifier isolation circuit except that this circuit isolates a changed potential condition at the output terminal of a centralized receiver associated with a second station from affecting the output terminal potential of a centralized receiver associated with a third station. A change of potential on the junction A–R caused by a message transmission from the second station 15–R is properly translated to change the bias at the input terminal 102–L of the coupling control circuit of the first station 15–L as previously described relative to FIGS. 3, 4, 5 and 6. This change of potential is isolated from the junction A–T so that the operation of the third station 15–T is unchanged. The junction A–R is similarly isolated from a change of potential at the junction A–T. Thus when the first station 15–L is transmitting and the stations 15–R and 15–T are receiving, either station 15–R or 15–T can send control signals directly to the station 15–L by bypassing the regenerative repeater and thereby avoid transmission to the other network station. Additionally, by sending a break signal, either station 15–R or 15–T can take over control of the network.

Additional inputs may be added to each of these previously described isolation circuits to accommodate more network stations.

What is claimed is:

1. In a multiple station telegraph network:
a unilateral transmission circuit having an input terminal and an output terminal,
a transmitting station having a transmitter circuit and a receiver circuit,
a plurality of receiving stations each having a transmitter circuit and a receiver circuit,
means coupling said transmitter circuit of said transmitting station to said input terminal,
means coupling said receiver circuits of said receiving stations to said output terminal, and
means responsive to an output signal from one of said receiving stations bypassing said transmission circuit and coupling each of said transmitter circuits of said receiving stations to said receiver circuit of said transmitting station

2. A network in accordance with claim 1 in which said unilateral transmission circuit comprises a regenerative repeater producing an output pulse for controlling said bypassing and coupling means.

3. In a multiple station telegraph network:
a unilateral transmission circuit having an input terminal and an output terminal,
a transmitting station having a transmitter circuit and a receiver circuit,
a receiving station having a transmitter circuit and a receiver circuit,
means coupling said transmitter circuits to said input terminal,
means coupling said output terminal to said receiver circuits,
means responsive to a signal from said transmitting station disabling said coupling of said transmitter circuit of said receiving station to said input terminal,
means responsive to said signal from said transmitting station disabling said coupling of said receiver circuit of said transmitting station to said output terminal, and
means bypassing said transmission circuit and coupling said transmitter circuit of said receiving station to said reeciver circuit of said transmitting station.

4. In a multiple station telegraph network:
a unilateral transmission circuit having an input terminal and an output terminal,
a sending station having a transmitting circuit and a receiving circuit,
a plurality of receiving stations each having a transmitting circuit and a receiving circuit,
means coupling said transmitting circuit of said transmitting station to said input terminal,
means coupling said output terminal to said receiving circuit of each of said receiving stations, and
means bypassing said transmission circuit coupling each of said transmitting circuits of said receiving stations to said receiving circuit of said transmitting station.

5. In a multiple station telegraph network:
a sending station having a transmitting circuit,
a plurality of receiving stations each having a transmitting circuit and a receiving circuit,
a regenerative repeater having an input terminal for receiving and an output terminal for receiving and an output terminal for retransmitting message signals from said transmitting circuit of said sending station,
means coupling said transmitting circuit of said sending station to said input terminal, separate means coupling each said transmitting circuit of said receiving stations to said input terminal,
means coupling said output terminal to each said receiving circuit, and
means responsive to a signal from said transmitting circuit of said sending station disabling said separate means coupling each of said transmitting circuit of said receiving stations to said input terminal.

6. In a multiple station telegraph network:
a transmitting station having a transmitting circuit and a receiving circuit,
a plurality of receiving stations each having a transmitting circuit and a receiving circuit,
a regenerative repeater having an input terminal coupled to each said transmitting circuit and an output terminal coupled to each said receiving circuit,
means responsive to a signal from said transmitting station inhibiting coupling of each said transmitting circuit of said receiving stations to said input terminal, and
means responsive to said signal inhibiting coupling of said receiving circuit of said transmitting station to said output terminal.

7. In a multiple station telegraph network:
a regenerative repeater having an input terminal for receiving message signals,
a transmitting station having a receive leg coupling said transmitting station to said terminal,
a plurality of receiving stations each having a receive leg coupling said receiving stations to said terminal, and
means responsive to a signal from said transmitting station disabling each said receive leg of said receiving stations from coupling said receiving stations to said input terminal.

8. The network in accordance with claim 7 in which:
said transmitting station has a send leg, and
means responsive to a signal from one of said receiving stations for bypassing said repeater and coupling said one receiving station through said receive leg of said one receiving station and through said send leg to said transmitting station.

9. A circuit for interconnecting input and output terminals of a regenerative repeater with a first station having a transmitter and a receiver and with a second station having a transmitter and a receiver, said circuit comprising:
means coupling said transmitter of said first station to said input terminal,
means coupling said transmitter of said second station to said input terminal,
means responsive to a first signal from said first station disabling said means coupling said transmitter of said second station to said input terminal,
means coupling said receiver of said first station to said output terminal,
means coupling said receiver of said second station to said output terminal,
means responsive to said first signal disabling said means coupling said receiver of said first station to said output terminal,
means responsive to said first signal and to a second signal from said transmitter of said second station bypassing said repeater and coupling said transmitter of said second station to said receiver of said first station, and
means responsive to said second signal for disabling said transmitter of said first station.

10. In a multiple station telegraph network:
a regenerative repeater having an input terminal and an output terminal,
a sending station coupled to said input terminal and to said output terminal,
a plurality of receiving stations each coupled to said input terminal and to said output terminal, said receiving stations each producing a predetermined signal,
a logic amplifier associated with each said sending station producing two complementary output signals from separate outputs in response to an input signal,
a first coincidence gate associated with said sending station producing said input signal in response to a different predetermined signal from said sending station and said predetermined signal from each of said receiving stations,
means coupling said first output signal from said logic amplifier for inhibiting the coupling of all said receiving stations to said input terminal,
means coupling a second output signal from said logic amplifier for inhibiting the coupling of said transmitting station to said output terminal,
a second coincidence gate associated with said sending station producing an enabling signal in response to said different predetermined signal from said sending station and a further signal from one of said receiving stations, and
means responsive to said enabling signal for bypassing said repeater and coupling said one receiving station to said sending station.

11. In a multiple station telegraph network:
a repeater having an input terminal,
a receiving station having an input and an output,
first coupling means coupling said receiving station output to said input terminal,
a sending station having an input and an output, means coupling said sending station output through said repeater to said receiving station input,
control means having a first input coupled to said sending station output, a second input, a first output connected to said first coupling means, and a second output,
second coupling means coupling said receiving station output to said second input of said control means for applying an enabling signal to said second input in response to a predetermined signal from said receiving station,
said first output of said control means producing a signal for disabling said first coupling means in response to said enabling signal and a different predetermined signal from said sending station,
third coupling means coupling said receiving station output to said sending station input and coupled to said second output, and
said second output of said control means producing an enabling signal in response to said predetermined signal and said different predetermined signal for enabling said third coupling means to couple a further signal from said receiving station output to said sending station input.

12. A communication network comprising:
a plurality of stations each having an output at which signals are produced when the station is transmitting and an input to which signals are coupled when the station is receiving,
a common repeater,
means coupling the output of each of said stations to the input of said repeater and coupling the output of said repeater to the input of each of said stations, and
a plurality of control circuits, one corresponding to each of said stations and providing interlocking connections among its corresponding station and all other of said stations, each of said control circuits comprises:
a logic circuit having an input and first and second outputs at which complementary signals are produced,
a first coincidence gate coupling the output of its corresponding station to said logic circuit input, for enabling said gate in response to a predetermined signal from said corresponding station, means coupling the first outputs of all other logic circuits to disable said first gate in response to said predetermined output signal from any of said other stations, a second coincidence gate coupling the outputs of any of said other stations to the input of said corresponding station, means coupling said logic circuit first output to disable said second gate when said corresponding station is receiving and to enable it when such station is transmitting, and means coupling said logic circuit second output to inhibit the coupling of all other station outputs to said repeater input when said corresponding station is transmitting.

References Cited

UNITED STATES PATENTS

| | | | |
|---|---|---|---|
| 2,334,551 | 11/1943 | Hanley | 178—73 |
| 2,337,496 | 12/1943 | Rea | 178—73 |
| 2,731,622 | 1/1956 | Doremus et al. | |
| 3,001,009 | 9/1961 | Light et al. | 178—2 |
| 3,002,053 | 9/1961 | Gilman et al. | 178—73 |

THOMAS A. ROBINSON, *Primary Examiner.*

U.S. Cl. X.R.

178—2; 340—147